United States Patent [19]

Einarsson

[11] Patent Number: 4,844,137

[45] Date of Patent: Jul. 4, 1989

[54] SELF-ADJUSTING TIRE STUD

[76] Inventor: Einar Einarsson, Studlasel 31, 109 Reykjavik, Iceland

[21] Appl. No.: 184,298

[22] Filed: Apr. 21, 1988

[51] Int. Cl.$^4$ .................. B60C 27/00; B60C 11/16
[52] U.S. Cl. .................................... 152/210; 152/211
[58] Field of Search ............... 152/210, 211, 169, 208, 152/240

[56] References Cited

U.S. PATENT DOCUMENTS

| | | | |
|---|---|---|---|
| 3,230,996 | 4/1964 | Hakka | 152/210 |
| 3,404,718 | 4/1966 | Smith | 152/210 |
| 3,538,970 | 11/1970 | Shwayder | 152/210 |
| 3,889,735 | 6/1975 | Salakari | 152/210 |
| 3,911,986 | 10/1975 | Cantz | 152/210 |
| 3,913,650 | 10/1975 | Salakari | 152/210 |
| 3,998,257 | 12/1976 | Mayra | 152/210 |

Primary Examiner—Michael W. Bell
Assistant Examiner—Gregory J. Wilber
Attorney, Agent, or Firm—Lloyd L. Zickert

[57] ABSTRACT

A stud for a tire to improve traction on a roadway which includes a hardened steel pin mounted in a plastic body and extending therefrom to engage the roadway, wherein the stud is sized for insertion into openings in a tire tread. The plastic body includes a portion that is collapsible so that the stud can self-adjust its position relative to the tread surface as it wears, whereby the steel pin is maintained in close relation to the tread surface throughout the life of the tire to provide the maximum road-engaging condition.

29 Claims, 2 Drawing Sheets

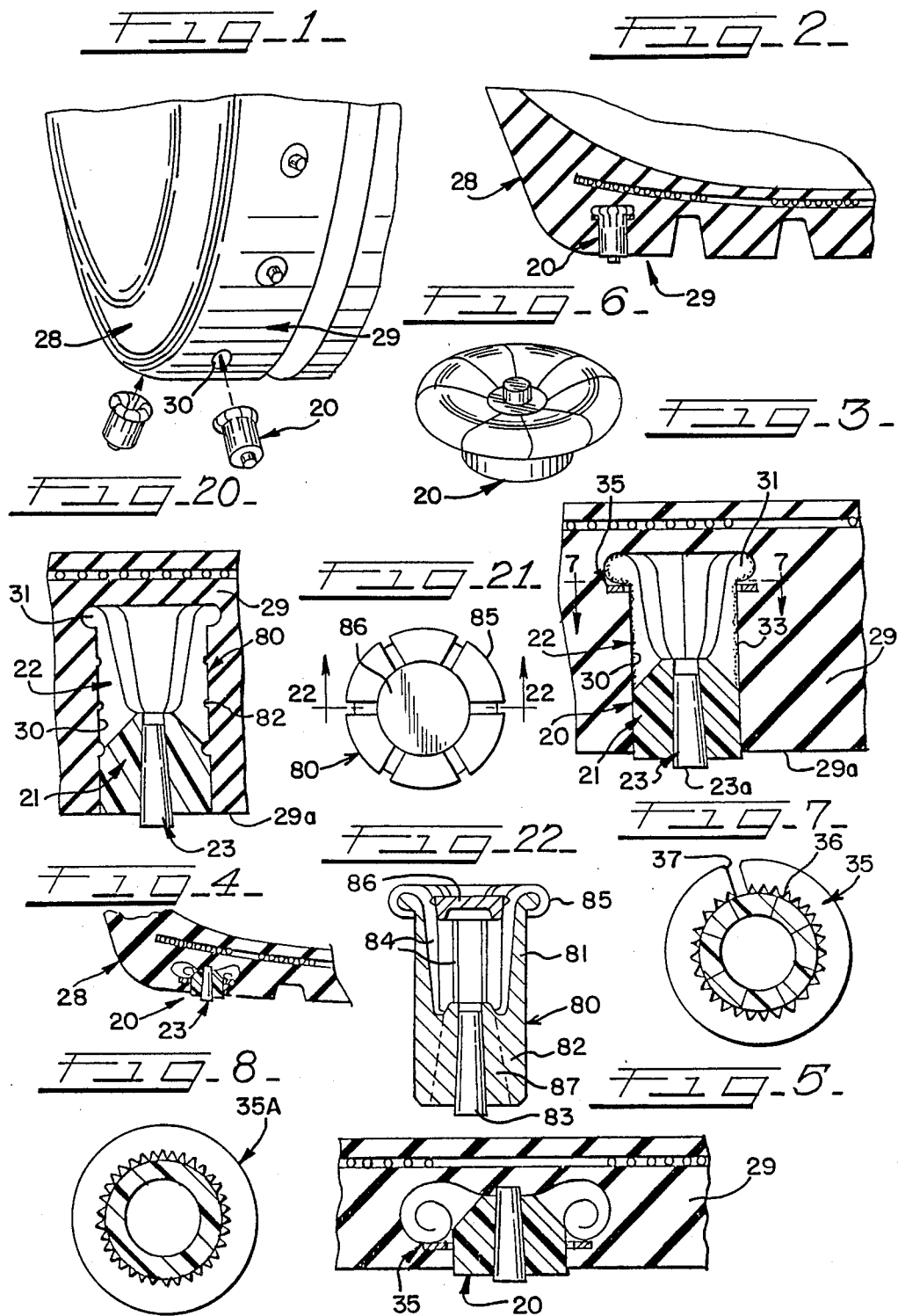

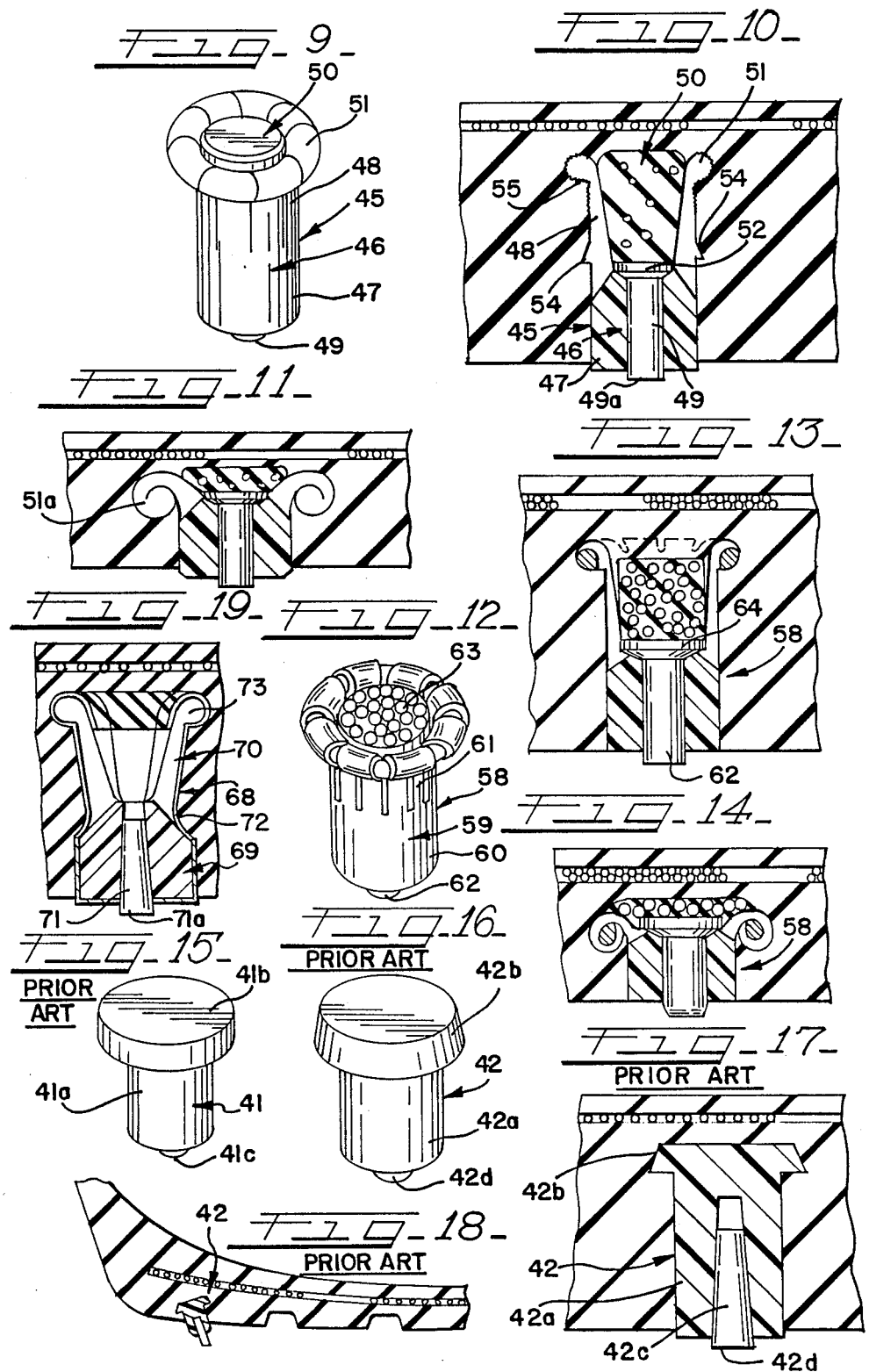

SELF-ADJUSTING TIRE STUD

This invention relates in general to a stud for a vehicle tire to improve traction of the tire on wet and slippery road surfaces, and more particularly to a stud that is readily insertable into a preformed opening in the tread of a tire, and still more particularly to a stud that is self-adjusting during the wearing of the tread so as to always provide the most efficient traction condition and substantially eliminate the chance of being dislodged.

BACKGROUND OF THE INVENTION

Heretofore, it has been well known to provide studs for tires and particularly studs that are insertable into preformed openings of a tire tread. Such studs have been used to improve the traction of the tire tread with slippery roadway surfaces. The studs have either been made completely of metal or include a metal pin mounted in a solid plastic body. Where the pin has been made completely of metal, it generally includes a cylindrical body having an enlarged area at one end which constitutes an enlarged flange portion constituting a head to be received within the tire tread and a reduced portion constituting a roadway engaging tip or point. Those studs that include a body of plastic with a hardened steel pin are similarly shaped but are of less cost and lighter weight than an all-metal stud. Thus, a tire would be provided with a plurality of studs circumferentially arranged on the tire tread to produce increased traction during a complete revolution of the tire.

These heretofore known studs operate properly when the tire tread is unworn or only slightly worn, as at that time the desired amount of stud is exposed from the tread surface to produce the maximum efficiency, and to have substantially the entire body of the stud except the tip or point surrounded and supported by the tire tread. But as the tire tread wears, more and more of the stud becomes exposed from the tire tread surface. As an additional amount of the stud becomes exposed, it then becomes subjected to additional forces generated between the tire and the road surface which often causes the stud to be completely dislodged from the tire tread, thereby defeating its intended purpose. Where the stud includes a body of plastic material and the body becomes more exposed from the tire tread surface and unsupported by the tread, it has been found that the plastic material cannot withstand the forces generated between the tire tread and the roadway surfaces, and it oftentimes disintegrates or fractures so that the whole stud becomes loose and dislodged. This then also defeats the purpose of the stud.

SUMMARY OF THE INVENTION

The tire stud of the present invention is constructed so that it is self-adjusting relative to the tread surface and retractable within the tire tread as it wears and will be at the most efficient position throughout the life of the tire, so that the main body of the stud will always be supported by the tire tread. This stud includes a collapsible portion which is absorbed or gradually reduced in size as to axial length, thereby allowing the stud to retract within the tire tread so that the road-engaging end of the stud maintains substantially the same relative position to the tread surface throughout the life of the tire and the body of the stud continues to be supported by the tread. For purposes of describing and understanding the invention, the tire tread is considered that part of the tire which wears during use and which includes a tread surface that engages the roadway surface to provide traction between the tire and the roadway surface. Accordingly, the stud of the invention includes a body of plastic material having a lower substantially solid portion in which a hardened steel pin is integrally mounted and an upper portion to be received within the tire tread that is collapsible automatically during the wearing of the tread surface so that the hardened steel pin and lower portion of the plastic body remain substantially at the same position relative to the tread surface throughout the life of the tire. This function thereby enhances the traction efficiency of the stud as the tire tread wears, and maintains substantially full support of the stud body to substantially eliminate the chance of dislodgement from the tread.

It is therefore and object of the present invention to provide a new and improved tire stud for a tire that will maintain traction efficiency throughout the life of the tire.

Another object of the present invention is in the provision of an improved tire stud for a tire that includes a collapsible portion receivable within the tire tread that automatically collapses as the tread surface is worn allowing the stud to retract into the tread, so that the road engaging portion of the stud remains substantially at the same position relative to the tread surface throughout the life of the tire.

Other objects, features and advantages of the invention will be apparent from the following detailed disclosure, taken in conjunction with the accompanying sheets of drawings, wherein like reference numerals refer to like parts.

DESCRIPTION OF THE DRAWINGS

FIG. 1 is a fragmentary perspective view of a tire showing the tread and illustrating the tire stud of the present invention in mounted relation and in exploded relation relative to the tread;

FIG. 2 is a fragmentary cross-sectional view of the tire in FIG. 1 and showing the tire stud of the invention in mounted relation to the tire tread:

FIG. 3 is a greatly enlarged vertical cross-sectional view of the tire stud shown in FIGS. 1 and 2 and in relation to the tire tread;

FIG. 4 is a fragmentary cross-sectional view of a tire where the tread has been worn and showing the tire stud of the present invention retracted within the tread with the upper portion collapsed to illustrate the same position of the road-engaging portion of the stud to the tread surface;

FIG. 5 is a greatly enlarged vertical cross-sectional view of the tire tread and collapsed stud of FIGS. 1 to 3 in a fragmentary section of the tire;

FIG. 6 is an enlarged perspective view of a collapsed tire stud removed from the tire tread;

FIG. 7 is a transverse sectional view taken substantially along lines 7—7 of FIG. 3 illustrating the optional safety ring used with the tire stud for enhancing the mounting of the stud within the tire tread;

FIG. 8 is a view similar to FIG. 7 but showing a modified safety ring which differs from that of FIG. 7 by being solid;

FIG. 9 is an enlarged perspective view of a modified stud according to the invention;

FIG. 10 is an enlarged vertical sectional view taken through the stud of FIG. 9 and also showing it in relation to a fragmentary section of a tire tread when it is initially inserted;

FIG. 11 is an enlarged transverse sectional view similar to FIG. 10 but illustrating the tire tread worn and the manner in which the stud collapses and self-adjusts to the tread surface;

FIG. 12 is an enlarged perspective view of a still further modified stud according to the invention;

FIG. 13 is a vertical transverse sectional view like FIG. 10 illustrating the stud of FIG. 12;

FIG. 14 is a view like FIG. 11 illustrating the collapsing of the stud embodiment of FIGS. 12 and 13 as the tire tread is worn;

FIG. 15 is a perspective view of a prior art stud made completely of metal;

FIG. 16 is a perspective view of a prior art stud made of plastic and including a metal pin defining the road-engaging tip or tooth;

FIG. 17 is a transverse sectional view taken through the prior art stud of FIG. 16 and shown in association with an unworn tire tread;

FIG. 18 is a transverse sectional view taken through a tire tread that is worn and illustrating the effect on the prior art stud of FIGS. 16 and 17 and that the stud is substantially exposed;

FIG. 19 is a vertical sectional view of a still further modified stud mounted in a tire;

FIG. 20 is a vertical sectional view of a further modification mounted in an unworn tire tread;

FIG. 21 is a top plan view of another modified stud; and

FIG. 22 is a vertical sectional view taken through the stud of FIG. 21 and substantially along line 21—21.

DESCRIPTION OF THE INVENTION

Referring to the drawings, and particularly to FIGS. 1 to 7, an embodiment of a tire stud according to the invention is illustrated as it is initially mounted in a tire tread and as it becomes worn. This tire stud is generally indicated by the numeral 20 and includes a body of plastic having a lower relatively solid portion 21 and an upper relatively hollow portion 22. A hardened steel pin 23 is permanently mounted in the lower solid portion 21 to define a tip or tooth that engages the road surface.

The body of the stud may be made of any suitable plastic material that will adequately support the hardened steel pin 23 and which will allow the upper portion 22 to collapse and be held in the tire tread. It will be understood that the stud 20 is shaped and sized to be received in a preformed hole in the tread of a tire. As with any stud, it is sized larger than the hole such that it is necessary to stretch the tread around the hole when inserting the stud, thereby defining a gripping relation between the tread and stud to hold the stud within the tread. The material around the hole would then be under tension. It will also be appreciated that the depth of the hole will be such that when the stud is bottomed in the hole, the tip or tooth will project from the tread surface to engage the road surface. The mounting of the stud 20 in a tire is shown in FIGS. 1 to 3 wherein a conventional tire 28 includes a tread 29 of any form having a plurality of preformed holes 30 circumferentially arranged on the tread. As above mentioned, the holes are sized smaller than the size of the stud so that when the stud is inserted, it will be resiliently gripped and held in the tread of the tire. The depth of the holes is such that it will relate to the size of the height of the studs so as to support the stud and dispose the tip of the steel pin 23 at the most efficient traction location relative to the tread surface 29a. This position is illustrated in FIGS. 2 and 3, although it should be appreciated that as long as the tooth or tip of the stud projects from the tread surface, the stud is properly inserted in the hole. It will be appreciated that any suitable tool may be used for inserting the studs into the preformed holes in the tread surface.

While the tire stud is cylindrical in shape, it may be of any suitable geometrical shape. It will be appreciated that the hardened steel pin 23 will be retained by the plastic body of the stud by molding the plastic body around and to the pin in a suitable well known fashion. Thus, the pin will be integral with the body. The plastic used may be of a thermoplastic or thermosetting type and of a type that will have a strength suitable for supporting and mounting the hardened steel pin and for withstanding the forces applied during the running of the tire and the wearing of the tread.

The lower portion 21 of the stud is relatively solid in configuration so as to provide a firm support for the hardened steel pin. The upper portion 22 is hollow and segmented to permit collapse as the tire tread surface becomes worn and the pressures of the road surface against the stud effectively drive the stud into the tire tread. So, the hollow portion 22 is axially slit or segmented to provide a plurality of circumferentially arranged segments which are capable of winding upon themselves during tire tread wear, as illustrated in FIGS. 4 and 5. At the very upper end of the hollow portion 22, the segments are formed in the shape of a bead 31 to enhance the gripping of the stud with the surrounding resilient material of the tire tread and to also assist in the collapsing of the segmented hollow portion. While the segments are illustrated as winding on the outside of the body, it will be appreciated they may be configured to wind up internally in the hollow of the upper portion.

In order to further enhance the locking of the stud in the preformed opening in the tire tread, it may optionally be exteriorly coated with a suitable adhesive that will appropriately interact with the resilient material of the tire tread and define a holding force. A coating of adhesive is illustrated in FIG. 3 by the numeral 33.

In order to further enhance the locking of the stud within the tire tread, a metal safety ring 35 may be arranged over the hollow portion 22 and at the bead 31, as illustrated in FIGS. 3 and 7. This ring would include a serrated inner edge 36 to enhance the gripping of the hollow portion. The ring would further be split at 37 to facilitate the mounting of the ring on the stud prior to insertion of the ring and stud into the preformed opening of the tread.

Thus, the split safety ring 35 serves to assist in maintaining the stud in the tread of the tire during running of the tire.

A modified split ring 35A is shown in FIG. 8 which differs from the split ring 35 in that it is a continuous ring. This ring may be used where the size tolerances are such that it can easily be slipped over the stud prior to insertion of the stud into the tire tread. Otherwise, the solid or continuous ring 35 operates in the same fashion as the ring 35.

Referring now to FIGS. 4, 5 and 6, during the wearing of the tread on the tire, the upper portion 22 of the stud will gradually collapse due to the pressure applied at the road surface and gradually cause the segments of the upper hollow portion to peel back or curl under within the tread as the tread wears until the stud takes on the form illustrated in FIGS. 4, 5 and 6. It will be understood that the tread has worn and that the hardened steel pin 23 will not wear appreciably, nor will the body of the plastic immediately surrounding the hardened steel pin wear appreciably, but that the upper hollow portion will collapse and allow the stud to gradually move or retract further into the tire tread. Accordingly, as the tread of the tire wears, the effectiveness of the stud remains the same in that the tooth 23a of the hardened pin 23 will maintain substantially the same relative position to the tread surface 29a throughout the life of the tire and the stud. Therefore, the studded tire will remain as an efficient traction tire throughout its life.

Referring now particularly to FIGS. 15, 16, 17 and 18 which show prior art studs, FIG. 15 shows a solid metal stud 41 having a body 41a, an enlarged head or flange 41b at the upper end, and a road surface lug or tooth 41c at the lower end. Another type of prior known stud is shown in FIGS. 16 and 17 and is designated by the numeral 42. It includes a body 42a, an enlarged head or flange 42b at the top of the body, and a hardened steel pin 42c defining a tip or tooth 42d. Except for the pin, the stud is made of plastic. The pin is tapered and may be assembled with the plastic body after it is molded. This stud is shown mounted in the tread of a tire in FIG. 17 and in cross section and in FIG. 18 after the tire tread has worn. It will be appreciated that since the stud cannot collapse, more and more of the stud protrudes from the tire tread surface once the tire tread wears; and then the stud is subjected to other forces which generally dislodges the stud from the tread and then, of course, that defeats the purpose of the stud.

Thus, it will be appreciated that the collapsible stud of the present invention not only maintains its position relative to the tread surface for efficient operation throughout the life of the tire but also will not protrude from the tire surface in a way that it can be subjected to forces that can cause it to be dislodged from the tire tread. Therefore, the stud of the invention will be more efficient and have more life relative to the life of the tire and continue the traction benefit of a stud.

Another embodiment of the invention is shown in FIGS. 9 to 11. The stud herein is generally designated by the numeral 45 and includes a body 46 of plastic material having a lower relative solid portion 47 and an upper relatively hollow portion 48, a hardened steel pin 49 defining a tooth or tip 49a, and a compressible resilient core or filler 50 within the upper hollow portion 48. While the filler material may be both compressible and resilient, it may just be compressible as long as it serves to additionally support the walls of the upper portion and assist in guiding their winding on each other during collapse of the upper portion. The plastic body 46 is cylindrically formed like the embodiment of FIGS. 1 to 3. Further, the upper hollow portion 48 is axially slit to define circumferentially arranged segments as in the embodiment of FIGS. 1 to 3. Finally, the upper end of the hollow body 48 is provided with an annular bead or flange 51 which is also similar to the construction of the stud in FIGS. 1 to 3. The body 46 may be made of a suitable plastic material that will adequately support the hardened steel pin 49 and which will allow the upper part of the body to collapse during wear of the tire tread and the application of force by the road surface to force the stud further into the tire tread.

The hardened steel pin 49 includes an enlarged head or flange 52 acting as a piston and which serves to compress the resilient core 50 as the stud collapses into the tire tread until the core has been compressed, as seen in FIG. 11. Concurrently with the compression of the core 50, the segmented upper portion of the body 48 peels back or curls under as generally illustrated at 51a in FIG. 11 to allow the stud to be gradually further depressed into the tire tread.

Any suitable core material may be used which will have the ability of providing a support for the upper hollow portion of the body during early life of the stud to insure the integrity of the upper hollow portion and also to provide an additional cushion for the stud during its early life. For example, a foam latex or foam polyurethane of suitable cellular construction and hardness will provide the desired support characteristics.

Optionally, the exterior of the plastic body 45 may be provided with a plurality of hook-shaped projections 54 around the circumference for the purpose of additionally defining a gripping condition between the stud and the surrounding tire tread material. Further, the upper exterior surface of the hollow portion 48 may be optionally roughened at 55 in any suitable manner to further increase the retention of the stud within the tire. The hooks 54 or the roughened surface 55 may be used alternatively or even in conjunction with providing an adhesive coating such as already mentioned in the embodiment of FIGS. 1 to 3.

The operation of the stud 46 during the wearing of the tire tread will be substantially the same as the operation of the stud 20. Most importantly, the upper part of the stud which initially provides support for the stud and the relationship of the hardened steel pin to the tread surface will collapse as the tread wears in order to maintain substantially the same relationship between the tip of the hardened steel pin and the tread surface throughout the life of the tire.

A further embodiment of the invention is shown in FIGS. 12 to 14 wherein the stud, generally indicated by the numeral 58, includes a plastic body 59 having a lower relatively solid portion 60 and an upper relatively hollow and segmented portion 61. A hardened steel pin 62 is received and supported in the lower portion 60, and a core of resilient and compressible material 63 is received within the upper hollow portion 61. This embodiment principally illustrates use of another type of material for the core 63. The core 63 illustrated is of balled rubber or tiny balls of a suitable material which is resilient and as a unit compressible as the stud moves into the tire tread during tire tread wear. The hardened steel pin 62 also includes an enlarged head or flange 64 which serves as a piston during the compressing of the core 33 when the stud moves into the tire tread. It will also be understood that the stud 58 functions substantially in the same manner as the stud 45 wherein it collapses during wear of the tire tread to maintain the tip of the hardened steel pin at the tire tread surface during the life of the tire.

Another modified stud according to the invention is illustrated in FIG. 19 and designated by the numeral 68. This stud is essentially the same as stud 20 of FIGS. 1 to 6 except that the outer surface of the body is not of uniform size longitudinally in that the upper portion includes a reduced area. Stud 68 includes a lower relatively solid section 69, an upper relatively hollow section 70, and a hardened steel pin 71. Like the embodiment of FIG. 3, the upper hollow portion is axially slit to define segments that facilitate the peeling back or collapsing of the upper portion during wear of the tire tread. It will be understood that the pin 71 of this stud is tapered like the pin 23 of the stud in FIG. 3 and wherein it may be either molded integrally with the body of the stud or assembled with the body after the body has been molded. When the pin is assembled with the body, the body is molded with a tapered opening and the pin is then inserted into the opening and tightly seated to maintain an essentially press fit relation with the body.

The exterior surface of the lower portion 69 is cylindrical and of uniform size essentially throughout its length. Just above the lower portion 69, the body is necked in at 72 with the surface thereabove flaring outwardly to the upper bead of flange 73. Again, the pin is sized and shaped so that it essentially defines a tooth or tip 71a projecting from the lower portion of the body. This embodiment will operate the same as the embodiment of FIG. 3 in that it will also collapse upon wear of the tread and the retraction of the stud into the tread. It will be appreciated as the tread wears, the depth of the preformed hole decreases, making it necessary for the stud to collapse within the tire tread in order to maintain the desired exposure of the stud from the tread surface for efficient traction and to prevent the stud from being excessively exposed or projected from the tread surface whereby it would be subjected to forces that would cause its dislodgement from the tire tread.

The stud embodiment of FIG. 20 differs from the other embodiments in that the means for assisting in retaining the stud in the tread includes annular grooves on the exterior surface of the stud body. This stud, generally indicated by the numeral 80, is essentially the same as stud 20 of FIG. 3, and therefore like numerals will be used for like parts. In order to assist retention of the stud in the tread hole 30, a plurality of axially spaced annular grooves B2 are formed on the exterior surface of the upper and lower portions 21 and 22 of the stud body. It may be appreciated that the grooves may only be on the upper portion or on the lower portion, although better retention will be provided when the grooves are formed on both portions. Further, the safety ring 35 in the embodiment of FIG. 3 may be optionally used on stud 80.

A further stud modification is shown in FIGS. 21 and 22, which is similar to the stud of FIG. 20 but differs in the structure of the stud body which retains the pin. This stud is generally designated by the numeral 80 and includes an upper portion 81 that is collapsible during wear of the tire tread and a lower portion 82 which includes an opening centrally along the vertical for receiving a tapered hardened steel pin 83 like that in the embodiments of FIGS. 3 and 20. The upper portion 81 has a hollow interior like the other embodiments but is not vertically split, and it terminates in an annular rim or bead 85. It does, however, include a plurality of circumferentially spaced and vertically extending interior grooves 84 that extend upwardly and through the rim 5. Thus, the vertical hollow wall at the upper end is weakened by the slots to facilitate collapsing or peeling back of the upper end during wear of the tread and retraction of the stud into the tread so that only the hardened tip remains at the wear surface of the tread for efficient gripping. Further, a cap 86, generally circular in shape and with an outer downwardly extending skirt, closes the upper end of the hollow interior of upper portion 81, and serves to block the inner end of the pin from penetrating the tread when the stud is collapsed. The cap may be made of any suitable material, such as hard plastic or metal. It also may optionally have peripheral teeth to engage the stud upper portion. This version may also have an area around the stud of a harder material than the material for the stud body as designated at 87. Thus, this embodiment will essentially function similar to the other embodiments whereby upon collapse of the stud during wear of the tire, the stud lower portion moves into the tread to maintain the hardened steel pin in substantially the same working relation with the tread surface throughout the life of the tread. However, as mentioned, the cap or plate 86 would serve as a stop to prevent the inner end of the pin from retracting too far and not extending from the stud body for road engagement.

It will be understood that modifications and variations may be effected without departing from the scope of the novel concepts of the present invention, but it is understood that this application is to be limited only by the scope of the appended claims.

The invention is hereby claimed as follows:

1. A self-adjusting stud for the tread of a tire to improve traction throughout the life of the tire which comprises, a body of plastic having a lower portion and an upper portion, a centrally disposed opening in the lower portion, a metal pin received in said opening and adapted to be disposed in working relation to the tire tread when the stud is mounted in the tire, said upper portion being centrally hollow and axially segmented to define a plurality of circumferentially arranged and axially extending segments, said segments being formed to gradually and permanently collapse because of the road pressure against the lower portion of said body as the tire tread wears to gradually reduce the axial length of the stud so that the stud effectively and gradually retracts into the tire tread and the pin remains in substantially the same working relation with the tire tread throughout the life of the tire tread, whereby the tire tread thereby provides substantially full support of the stud throughout the life of the tire tread.

2. The self-adjusting stud of claim 1, which further comprises a filler of compressible material within said hollow upper portion.

3. The self-adjusting stud of claim 1, wherein the body is substantially cylindrical.

4. The self-adjusting stud of claim 1, wherein the body includes a substantially uniform exterior dimension throughout its length.

5. The self-adjusting stud of claim 1, wherein the lower portion of the body is of a substantially uniform exterior dimension, and said upper portion is necked in and then flared outwardly.

6. The self-adjusting stud of claim 1, wherein an annular bead is provided at the upper portion for assisting retention in the tire tread.

7. The self-adjusting stud of claim 1, wherein at least part of the exterior surface of the body is roughened to assist retention in the tire tread.

8. The self-adjusting stud of claim 1, wherein the exterior surface of the body includes at least one annular groove to assist retention in the tread.

9. The self-adjusting stud of claim 1, wherein the exterior surface of the body includes a plurality of annular grooves to assist retention in the tire tread.

10. The self-adjusting stud of claim 1, wherein the stud further comprises a coating of adhesive over at least part of the exterior surface to assist in retention in the tire tread.

11. The self-adjusting stud of claim 1, wherein the stud further includes a safety ring at its exterior to assist in retention in the tire tread.

12. The self-adjusting stud of claim 11, wherein the safety ring is split.

13. The self-adjusting stud of claim 11, wherein the safety ring is continuous.

14. The self-adjusting stud of claim 2, wherein the filler material is also resilient.

15. The self-adjusting stud of claim 2, wherein said pin includes an enlarged head bearing against the filler material.

16. The self-adjusting stud of claim 6, wherein the annular bead also serves to guide the collapsing of the segmented upper portion.

17. The self-adjusting stud of claim 1, wherein said segments wind upon themselves when they collapse during tire tread wear.

18. The self-adjusting stud of claim 1, wherein the upper hollow portion of said body peels back or curls under within the tire tread during tire tread wear.

19. A self-adjusting stud for insertion into a preformed hole in the tire tread of a tire to improve traction between the tread surface of the tire and a road surface on which the tire would run throughout the life of the tire which comprises, a body of plastic having a lower portion and an upper portion, said lower portion being substantially solid, a metal pin centrally disposed in said lower portion having a tip end projecting therefrom and defining a tooth projecting from the tire tread for engaging the road surface during running of the tire, said upper portion being constructed to gradually and permanently reduce the axial length of the stud and collapse in the tire tread in response to wear of the tire tread thereby allowing the stud to effectively and gradually retract into the tire tread so that the pin remains in substantially the same working relation with the tread surface of the tire throughout the life of the tire tread and the tire tread thereby provides substantially full support of the stud throughout the life of the tire tread.

20. The self-adjusting stud of claim 19, which further comprises a filler of compressible material within said hollow upper portion.

21. The self-adjusting stud of claim 19, wherein an annular bead is provided at the upper portion for assisting retention in the tire tread.

22. The self-adjusting stud of claim 19, wherein at least part of the exterior surface of the body is roughened to assist retention in the tire tread.

23. The self-adjusting stud of claim 19, wherein the stud further comprises a coating of adhesive over at least part of the exterior surface to assist in retention in the tire tread.

24. The self-adjusting stud of claim 19, wherein the stud further includes a safety ring at its exterior to assist in retention in the tire tread.

25. The self-adjusting stud of claim 19, wherein part of the side wall of the body is straight and part is tapered.

26. The self-adjusting stud of claim 19, wherein the side wall of the body is cylindrical.

27. The self-adjusting stud of claim 19, wherein internal groves are provided for the upper portion to facilitate its collapse during tread wear and retraction of the stud into the tread.

28. The self-adjusting stud of claim 19, wherein the upper portion is hollow, and which further includes a cap at the upper end of the upper portion to block the pin from penetrating the tread when the stud is collapsed.

29. The self-adjusting stud of claim 19, wherein the area of the lower portion immediately surrounding the pin is harder than the remainder of the stud.

* * * * *

UNITED STATES PATENT AND TRADEMARK OFFICE
CERTIFICATE OF CORRECTION

PATENT NO. : 4,844,137
DATED : July 4, 1989
INVENTOR(S) : EINAR EINARSSON

It is certified that error appears in the above-identified patent and that said Letters Patent is hereby corrected as shown below:

```
Col. 6, line 54, change "33" to --63--;
Col. 7, line 39, change "B2" to --82--;
Col. 7, line 61, change "5" to --85--.
```

Signed and Sealed this

Twenty-seventh Day of March, 1990

Attest:

JEFFREY M. SAMUELS

Attesting Officer

Acting Commissioner of Patents and Trademarks